(12) United States Patent
Giardina

(10) Patent No.: US 7,489,719 B1
(45) Date of Patent: Feb. 10, 2009

(54) TRAINING SEQUENCES, METHODS AND WIRELESS COMMUNICATION SYSTEMS PROVIDING SECURITY-ENHANCED INITIALIZATION

(75) Inventor: Charles R. Giardina, Mahwah, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 574 days.

(21) Appl. No.: 11/126,611

(22) Filed: May 11, 2005

(51) Int. Cl.
*H04B 1/00* (2006.01)
(52) U.S. Cl. ...................................................... 375/130
(58) Field of Classification Search ................. 375/130, 375/141, 144, 146–147, 224, 295, 316
See application file for complete search history.

(56) References Cited

U.S. PATENT DOCUMENTS 5,732,113 A * 3/1998 Schmidl et al. ............. 375/355
7,149,239 B2 * 12/2006 Hudson ...................... 375/144
2002/0176485 A1 * 11/2002 Hudson ...................... 375/144
2003/0067961 A1 * 4/2003 Hudson et al. .............. 375/130

* cited by examiner

*Primary Examiner*—Khanh C Tran
(74) *Attorney, Agent, or Firm*—Kenneth P. Robinson

(57) ABSTRACT

Training sequences, for transmittal with an individual data packet via a wireless communication channel, enable estimation of the channel impulse response (CIR) to provide values usable for correction of multipath and other transmission disturbances with enhanced security and avoidance of complex processing. Training sequences employing several groupings of pseudonoise sequences enable a receiver to derive several observations of the CIR for each data packet received. Averaging of values of the several CIR estimations provides a CIR estimation of increased accuracy usable in determining coefficients to adjust taps of an adaptive equalizer for signal correction for the data of the packet. Training sequences with use of distinct pseudonoise sequences in several individual groupings enhance security, while simplifying processing by avoidance of necessity for multiplication or division of complex functions. Training sequences, systems and methods are described.

30 Claims, 4 Drawing Sheets

TRAINING SEQUENCES, METHODS AND WIRELESS COMMUNICATION SYSTEMS PROVIDING SECURITY-ENHANCED INITIALIZATION

STATEMENT OF GOVERNMENT INTEREST

The invention claimed in this patent application was made with United States Government support under contract No. DAAB07-02-C-C403 awarded by the United States Army. The United States Government has certain rights in the invention.

RELATED APPLICATIONS (Not Applicable)

BACKGROUND OF THE INVENTION

This invention relates to digital wireless communications systems and, more particularly, to transmission channels subject to disturbances such as frequency-selective fading and multipath effects.

In high data throughput wireless digital communication systems, the maximum data transmission rate may be limited by disturbances in the wireless propagation path (i.e., the communication channel). These effects include disturbances such as frequency-selective fading and multipath (copies of the transmitted signal delayed in time to the receiver). These disturbances may result in interference between the digitally-modulated symbols representing the information bits to be transmitted, thus impairing the receiver's demodulator from correctly decoding the received symbols to arrive at accurate bit decisions. This "intersymbol interference" may cause the received symbols to overlap the decision boundaries in the complex signal space to adjacent symbols and result in either bit decision errors or lowered bit decision confidence. Systems subject to these effects may thus be required to operate at lower data throughput rates or higher error rates than would otherwise be attainable.

A traditional solution to such channel disturbance problems is to provide an adaptive equalizer consisting of a digital filter whose coefficients can be adjusted to model the inverse of the actual channel impulse response. The resulting digital filter thus enables compensation for the effects of channel nonlinearity by providing this reciprocal of the actual channel impulse response (e.g., a polarity-inverted representation of the channel transmission characteristics as degraded by whatever such disturbances are actually present at a particular time). The determination of the channel impulse response is typically performed by transmitting a test pattern (i.e., a training sequence) to excite the channel at all frequencies, or all frequencies of significant interest, within the data bandwidth of interest and measuring the resulting effect on the training sequence waveform upon transmission through the channel. The calculation of filter coefficients to model the channel impulse response based upon this measurement has typically been done using an estimation process such as a Mean Square Error algorithm.

In digital transmission systems operating at high data rates (such as military communications systems or for commercial wireless Internet access), the channel impulse response estimation time (i.e., the time required to provide such filter coefficients) becomes a critical factor. Since the disturbance effects may be constantly changing, the impulse response estimate must be updated frequently to accommodate high data rates. As a result, the time required to calculate the channel impulse response may become an important factor limiting the maximum data rate of the system. Established techniques and methods for calculating the channel impulse response have typically been subject to constraints on speed, accuracy, security or other relevant factors.

In applications in which security of transmitted information is important, it is desirable that a training signal have characteristics such that, when transmitted, it is substantially undetectable to provide a high level of security and, when received, it is readily usable by processing which can be employed rapidly and with limited complexity. Thus, in addition to security, avoidance of transmission speed constraints resulting from processing requiring multiplication or division of complex mathematical functions is desirable.

Objects of the present invention are, therefore, to provide forms of training sequences and communication systems and methods which are new or improved and which may provide one or more of the following capabilities or characteristics:

provision of improved forms of training sequence;

multiple channel impulse response estimations from processing of a training sequence transmitted with a data packet;

increased accuracy of results by averaging values of multiple channel impulse response observations;

provision of channel impulse response estimations without requirement for multiplication or division of complex functions;

improved capability to estimate channel impulse response;

rapid estimation of channel impulse response;

system initialization with enhanced security via changing training sequence coding.

SUMMARY OF THE INVENTION

In accordance with an embodiment of the invention, a communication system usable with a wireless communication channel includes transmitting and receiving configurations. The transmitting configuration is arranged to transmit via such channel a training sequence usable for channel impulse response (CIR) estimation. The training sequence may include:

a first pseudonoise (PN) sequence grouping including a selected PN sequence followed by a repeated portion of the selected PN sequence, a series of additional PN sequence groupings following the first PN sequence grouping, such series comprising at least one additional PN sequence grouping including a distinct PN sequence followed by a repeated portion of the distinct PN sequence, with the distinct PN sequence differing from the selected PN sequence, and intermediate integers positioned between the PN sequence groupings and including a selected number of integers of at least one selected value.

The receiving configuration, to process the training sequence as received via the channel, may be arranged (i) to provide a first CIR observation by use of the first PN sequence grouping as received and at least one additional CIR observation by use of the series of additional PN sequence groupings and (ii) to provide a CIR estimation via an averaging of values of the first and additional CIR observations.

In accordance with a second embodiment, a communication system, usable with a wireless communication channel, includes receiving and transmitting configurations. The receiving configuration is arranged to process a training sequence as received via such channel to provide channel impulse response (CIR) estimation and may include an adaptive equalizer unit with a predetermined number of inputs or taps. The transmitting configuration is arranged to transmit via such channel a training sequence such as described above, wherein each PN sequence is nominally of maximal length, including a number of integers nominally equal to the number of inputs to the adaptive equalizer unit.

Also in accordance with the invention, a training sequence, usable for wireless communication channel impulse response (CIR) estimation with a receiving configuration including an adaptive equalizer unit having a predetermined number of inputs may include:

a first pseudonoise (PN) sequence grouping including a selected PN sequence followed by a repeated portion of the selected PN sequence;

a series of additional PN sequence groupings following the first PN sequence grouping, such series comprising at least one additional PN sequence grouping, including a distinct PN sequence followed by a repeated portion of the distinct PN sequence, with the distinct PN sequence differing from the selected PN sequence; and intermediate integers positioned between the PN sequence groupings and including a selected number of integers of at least one selected value.

Such training sequence may also include at least one leading integer preceding the first PN sequence grouping and at least one trailing integer following the last PN sequence grouping, with each of such integers including a selected number of integers of at least one selected polarity.

Further in accordance with the invention, a method, of providing a training sequence for estimation of channel impulse response of a wireless communication channel, may include the steps of:

(a) assembling a first pseudonoise (PN) sequence grouping including a selected PN sequence followed by a repeated portion of such selected PN sequence;

(b) assembling a series of additional PN sequence groupings comprising at least one additional PN sequence grouping including a distinct PN sequence followed by a repeated portion of that distinct PN sequence, the distinct PN sequence differing from said selected PN sequence;

(c) assembling a training sequence including the first and additional PN sequence groupings and intermediate integers positioned between the PN sequence groupings, such intermediate integers comprising a selected number of integers of at least one selected value;

(d) transmitting the training sequence;

(e) receiving the transmitted training sequence;

(f) deriving a plurality of CIR observations, one based on each of the first and additional PN sequence groupings; and (g) deriving a CIR estimation based on an averaging of values of the plurality of CIR observations.

For a better understanding of the invention, together with other and further objects, reference is made to the accompanying drawings and the scope of the invention will be pointed out in the accompanying claims.

DESCRIPTION OF THE INVENTION

Figure 1:
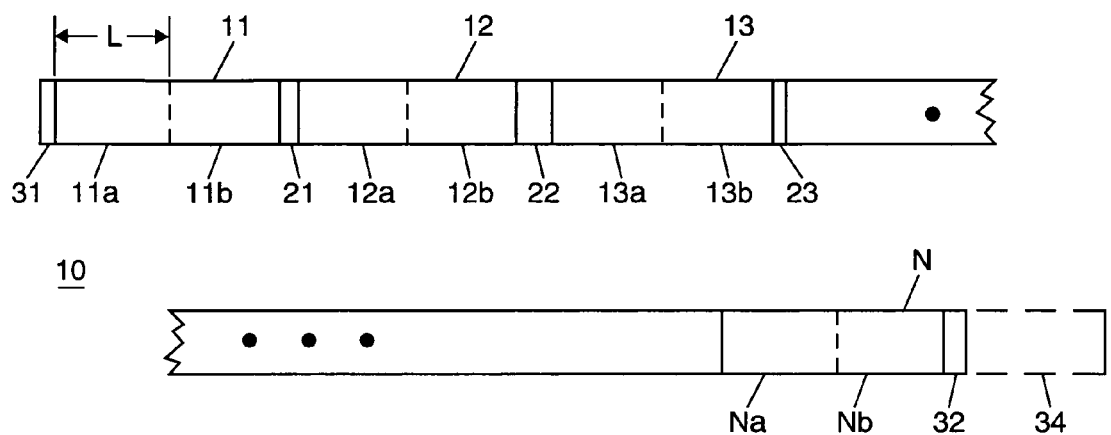
FIG. 1 is a representation of a training sequence configuration pursuant to the invention.

FIG. 1 illustrates a configuration of a training sequence 10 constructed in accordance with the invention. As shown, training sequence 10 includes a first pseudonoise (PN) sequence grouping 11 followed by a series of additional PN sequence groupings 12, 13 . . . N. The first PN sequence grouping includes a selected PN sequence 11a followed by a repeated portion of the selected PN sequence 11a, which is identified in FIG. 1 as PN sequence 11b. Thus, for example, PN sequence 11b may be identical to PN sequence 11a, except that the last bit of PN sequence 11a is deleted in providing PN sequence 11b. In this context, the term "portion" is defined as meaning all or a part of a whole.

The PN sequences utilized may, for example, be selected at random from a group of distinct equal maximal length PN sequences derived on a random basis in advance and stored so as to be available for such use. In the series of PN sequence groupings 12, 13 . . . N shown in FIG. 1, each includes a PN sequence (e.g., sequence 12a) followed by a repeated portion of that sequence (e.g., sequence 12b identical to sequence 12a with its last bit deleted). Thus, the series of additional PN sequence groupings 12, 13 . . . N of a training sequence comprises at least one PN sequence grouping including a distinct PN sequence differing from the selected PN sequence of the first PN sequence grouping 11. Typically, the PN sequence of each of the groupings 12, 13 . . . N will differ from each other and be different than the PN sequence of grouping 11, however, with random selection repetition of a PN sequence in the series is a possibility. The term "distinct" is defined as meaning differing, so that a distinct PN sequence is distinguishable from another by a different coding sequence, for example.

Training sequence 10 of FIG. 1 further includes intermediate integers 21, 22, 23 positioned between each pair of successive PN sequence groupings as shown. Thus, in FIG. 1, training sequence element 21 comprises intermediate integers between PN sequence groupings 11 and 12, with intermediate integers 22 and 23 positioned respectively between the successive pair of PN sequence groupings 12 and 13, and between grouping 13 and the following PN sequence grouping N. Each occurrence of such intermediate integers will comprise a selected number of integers (e.g., one, two or three integers or chips) of at least one selected polarity or value (e.g., each integer having either a + or − value). The number and polarity of the intermediate integers may be randomly determined as to each occurrence (e.g., independently determined at 11, 12, 13). In this context, it will be understood that random selection or random determination does not require absolute randomness, but only a level of randomness as may be determined by skilled persons as being adequate in particular implementations of the invention. Thus, pseudorandom techniques may be employed as appropriate.

In the FIG. 1 training sequence embodiment there are also included at least one leading integer 31, shown preceding the first PN sequence grouping 11, and at least one trailing integer 32, shown following the final PN sequence grouping N. As described above with respect to the intermediate integers 21, 22, 23, the at least one leading and trailing integers 31 and 32 may each comprise one to three integers of at least one polarity selected on a random basis as discussed for the intermediate integers.

Training sequence 10 of FIG. 1 may further include an initial condition (IC) suffix 34 at the end of the training sequence. IC suffix 34 may be a sequence code recognizable by the receiving configuration and usable in correctly initializing the adaptive equalizer unit.

Once having an understanding of the training sequence as described with reference to FIG. 1, skilled persons will be enabled to provide modifications and variations thereof as suitable for use in particular applications and implementations. As will be described in further detail, the training sequence includes a plurality of PN sequence groupings which utilize individual PN sequences of what may be termed maximal length. The term "maximal length" is defined as the largest number of integers in the sequence generated by a shift register before repeating. Generally, the maximal PN sequence length in this context will be equal to $2^n-1$, where "n" is the number of stages of a shift register. Thus, for three stages the maximal length would be 7 integers, while for five stages the maximal PN sequence length would be 31. As will be described, use of maximal length PN sequences included in a plurality of PN sequence groupings (e.g., groupings 11, 12, 13 . . . N of FIG. 1) enables a plurality of up to N channel impulse response (CIR) observations to be derived at a receiver upon reception of a data packet including a single training sequence. By then providing an averaging of the parameter values of a plurality of such CIR observations (i.e., performing an "ensemble average") there can be obtained a more accurate estimate of the actual channel impulse response as it then pertains (i.e., a CIR estimation). The term "observation" is thus used in its ordinary dictionary sense of noting or recording a value and, as described, an estimation may be derived by an averaging of observations. In some instances, a PN sequence may be referred to as being nominally of maximal length. The term "nominal" is defined as meaning within plus or minus fifteen percent of a referenced number, quantity or value (e.g., a PN sequence and the following repeated portion of that PN sequence, which lacks one bit, may each be nominally of the same or maximal length).

Figure 2:
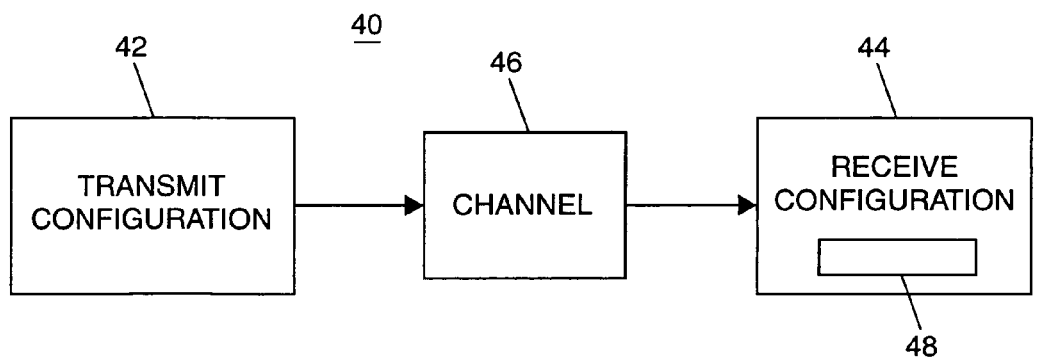
FIG. 2 is a simplified block diagram of a communication system.

FIG. 2 is a simplified block diagram representation of a wireless communication system 40 including transmitting configuration 42 and receiving configuration 44. A wireless communication channel is represented at 46 and suitable antennas (not shown) and other components may be employed. Transmitting configuration 42 may be arranged to transmit a training sequence usable for channel impulse response (CIR) estimation as will be further described. Receiving configuration 44 may be arranged to use the training sequence, after transmission via wireless communication channel 46, for CIR estimation as will be further described and, more particularly, may employ an adaptive equalizer unit 48 for that purpose. Adaptive equalizer unit 48 may, for example, comprise an adaptive filter having a predetermined number of inputs or taps. Skilled persons will be knowledgeable of prior use of such adaptive filters and of many other aspects of implementation and operation of wireless communication systems, including use and characteristics of prior training signals, as well as pseudonoise signals, spread spectrum transmission and other techniques to provide secure communication and other capabilities.

Figure 4:
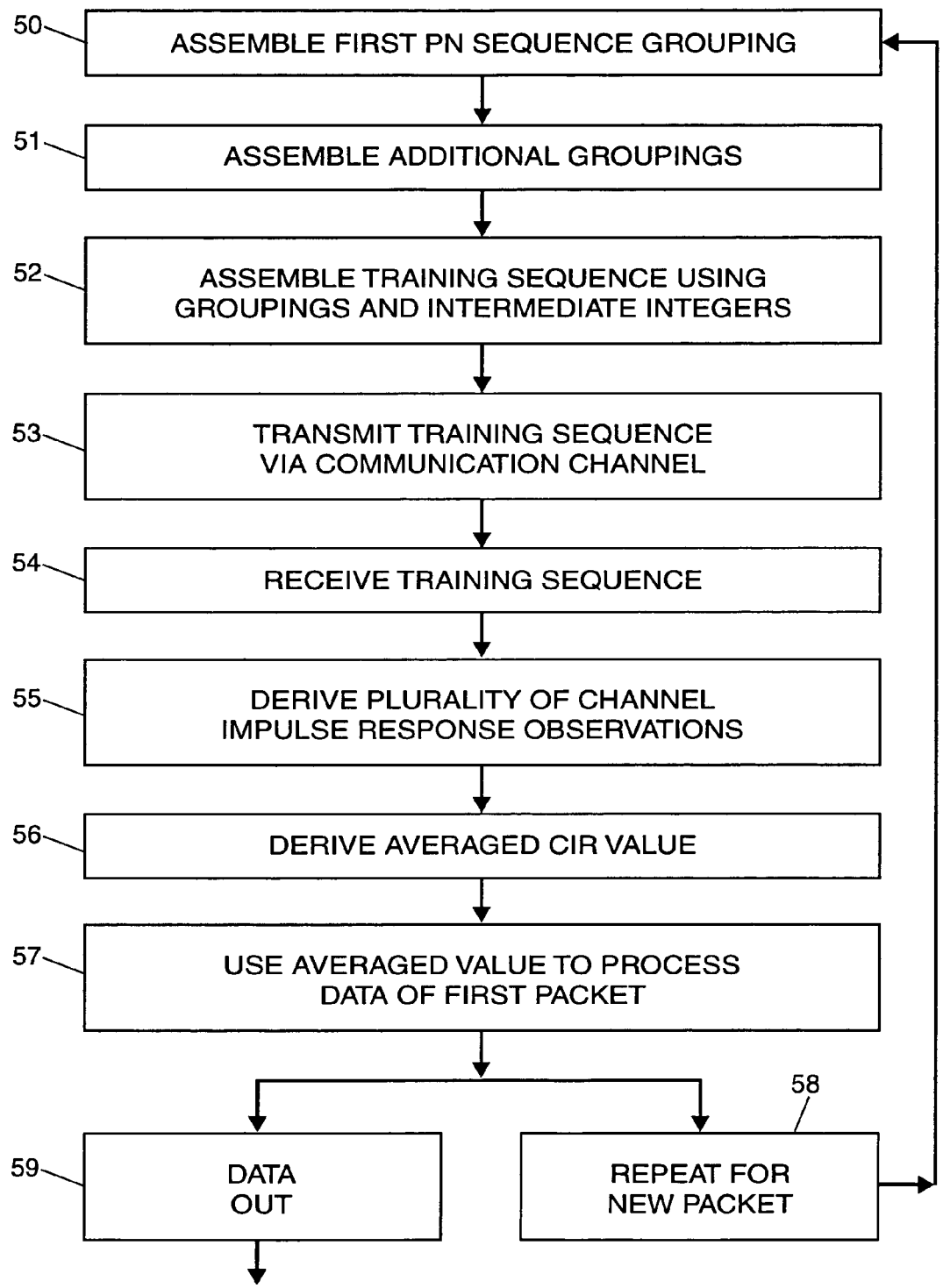
FIG. 4 is a flow chart useful in describing a method pursuant to the invention.

Referring now to FIG. 4, there is provided a flow chart useful in describing a method pursuant to the invention. As illustrated in FIG. 4, a method of providing a training sequence of the type shown in FIG. 1, for example, for estimation of CIR of a wireless communication channel, may include the following.

At step 50, assembling a first pseudonoise (PN) sequence grouping 11 including a selected PN sequence followed by a repeated portion of the selected PN sequence.

At step 51, assembling a series of additional PN sequence groupings 12, 13 . . . N of the same form with at least one such grouping employing a distinct PN sequence.

At step 52, assembling a training sequence 10 including the PN sequence groupings of steps 50 and 51 and intermediate integers 21, 22, 23 positioned therebetween and comprising integers of selected number and value or polarity.

At step 53, transmitting the training sequence via a communication channel (e.g., via inclusion in a data packet).

At step 54, receiving the training sequence, which may have been subjected to distortion effects of frequency-selective fading, multipath, etc., during transmission via the communication channel.

At step 55, deriving a plurality of channel impulse response (CIR) observations (e.g., one observation based on each of the PN sequence groupings of the training sequence).

At step 56, deriving a CIR estimation value based on an averaging of values of the plurality of CIR observations.

At step 57, using the CIR estimation value of step 56 to process data of a first data packet with which the training sequence was associated, in order to correct for distortion effects during transmission (e.g., by applying coefficients to taps of an adaptive equalizer filter).

Further steps to the method of FIG. 4 may include repeating steps 50 through 57 via step 58, with substitution of a second training sequence assembled from newly selected PN sequences, etc. Output of user data is provided at step 59, as indicated in FIG. 4.

Implementations of this method may include fewer, additional or changed steps as may be appropriate for particular applications as determined by skilled persons.

Arrangements, operation, signal processing techniques, etc., more particularly applicable to systems and training signals pursuant to the invention will be further described below. A system and receiver/transmitter assembly of the type which may be employed for present purposes is described in copending U.S. patent application Ser. No. 11/096,418, filed Apr. 1, 2005, titled "Transmission Channel Impulse Response Estimation Using Fast Algorithms", having a common assignee and which is hereby incorporated herein by reference.

Training Signal Characteristics

Characteristics of training sequences which may be employed pursuant to the invention will be further considered. A training sequence may be a fixed number, K, of integers or chips in length. For a given chip rate this equates to a fixed time interval. No more than K chips, or the equivalent time interval, will be allocated to a training sequence It is desirable for present purposes that training sequences enable as large a number of observations or estimations of the channel impulse response (CIR) as can be provided. This number is a function of the number of taps within the adaptive equalizer (e.g., digital filter with adjustable coefficients). In this context, it is assumed that the maximum number of observations which can be performed on the basis of the allocated time interval is equal to N. Once all such observations are carried out at the receiving configuration, an ensemble average is performed, thereby providing an estimate of the CIR. A result is that the variability of this averaged estimate is reduced by the number of observations which are averaged.

For an assumed identical independent, white noise environment the variance of the ensemble average of N such processes equals 1/N times the variance of an individual process. Thus, use of a number of CIR observations approaching N observations will provide increased accuracy of the averaged estimate of the CIR and CIR coefficients derived for application to the adaptive equalizer.

Following a general discussion of a simplified form of training sequence, two training sequences of the form shown in FIG. 1 will be addressed. The first of such two training sequences utilizes QPSK (quadrature phase shift keying) modulation of PN sequences and the second utilizes what are termed violated OQPSK (offset quadrature phase shift keying) modulation of PN sequences. Use of the QPSK and OQPSK forms of modulation is known to skilled persons.

The simplified form of training sequence may include N delta function groupings. Each such grouping has a single impulse with a M−1 chip duration (of zeros) till the next grouping. These groupings are followed by a single initial condition (IC) stream used in correctly initializing the filters within the adaptive equalizer unit. This training sequence is described to provide a theoretical background for consideration of the two training sequences referred to.

Figure 3:
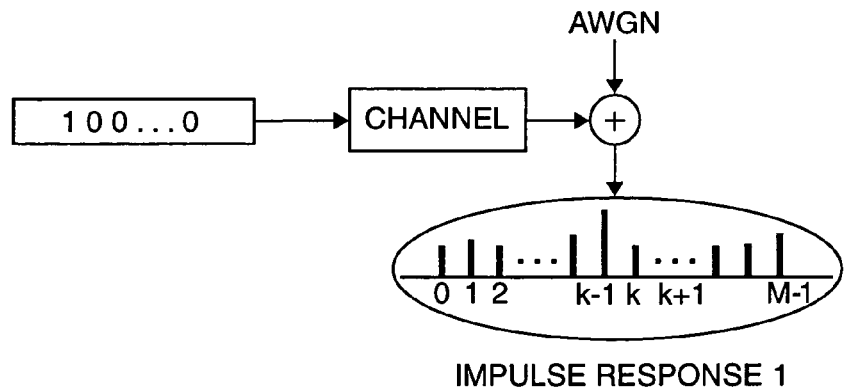
FIG. 3 illustrates the obtaining of a channel impulse response (CIR) observation upon processing of a training sequence.

Consider a single "delta function" grouping [1 0 0 . . . 0], as illustrated in FIG. 3. Not shown in this diagram is the modulation symbol. It acts as a scaling factor and it can be removed at the receiving end. Additionally, the presence of suitable transmit and receive filters is not considered in this discussion. Utilizing standard linear systems theory enables the CIR to be observed. With the exception of the assumed additive white gaussian noise (AWGN), the CIR is the convolution of the input (delta function stream) with the communication channel.

The observed CIR is complex valued as is the OQPSK signal point which is used as a divider. Since the CIR is noisy, a total of N observations are made and an ensemble average is performed as will be discussed with reference to FIG. 6. This averaging produces a more accurate description of the channel. The averaged channel response is used in determining processing parameters (e.g., the existence of precursors and post cursors for signal processing purposes) as well as in implementing the parameter estimation capabilities of the training mode. Other training sequences to be described use a similar averaging process and parameter estimation process.

The first and second training sequences to be addressed with reference to FIG. 1 each utilize several maximal length PN sequences. Each such sequence has a length, L, a value only slightly larger than the number of taps, M, of the digital filter of the adaptive equalizer unit. For these sequences, less than N cycles of the PN sequences are utilized for the training mode. The last M chips of the training sequence are utilized for inclusion of initial condition (IC) data which is encoded using strict OQPSK protocol. IC type data is used here due to the type of modulation employed on the PN sequences.

Selection of PN sequences in the form of primitive polynomials as well as selection of their starting points (via use of a phase shift network (PSN) or by using code book methods) may be determined under control of a cryptographic unit in this example. Each individual PN sequence is used for only two consecutive cycles (e.g., 11a and 11b in FIG. 1) and the last bit within the second such cycle is negated. As indicated above, the combination of sequences 11a and 11b is referred to as a PN sequence grouping. Additionally, random chips of duration 1, 2 or 3 separate every PN sequence grouping (e.g., as at 21, 22, 23 in FIG. 1). These intermediate chips both in number and value or polarity are also determined by a cryptographic unit, as are the leading and trailing chips (e.g., as at 31 and 32 in FIG. 1) which start the training sequence and end it prior to the IC integers (e.g., as at 34 in FIG. 1). The number of CIR observations that can be obtained is approximately given by [(K−M)/2L]. However, for the extent of randomization obtained by use of the maximal length PN sequences as described, the chances of two training sequences being the same for two distinct transmissions of data (e.g., used for two different data packets) is estimated on the basis of calculations to be less than one in a million.

A set of equations can be set up. Let a single PN sequence grouping be represented by:

$$n_0 n_1 n_2 \ldots n_{L-1} n_0 n_1 \ldots n_{L-1}$$

This is a pure PN sequence, and so it consists of just +/−1 type entries. Let the desired channel impulse response be:

$$h = [h_{L-1} h_{L-2} \ldots h_0]'$$

Let the received vector involve a scalar a, due to the modulation symbols being used (i.e., not OQPSK). The received signal is the convolution of the modulated transmitted signal with the channel and the value a "undoes" the modulation in the received signal. For the first training sequence example (using QPSK modulation) this modification works. It results in simple matrix inversion and simple hardware implementation. The modified received signal is:

$$r/a = [r_{L-1} r_L \ldots r_{2L-2}]'/a$$

The matrix equation enabling h to be found by knowing the PN sequence is obtained from:

$$h_{L-1} n_0 + h_{L-2} n_1 + \ldots + h_0 n_{L-1} = r_{L-1}/a$$

$$h_{L-1} n_1 + h_{L-2} n_2 + \ldots + h_0 n_0 = r_L/a$$

$$\ldots$$

$$h_{L-1} n_{L-1} + h_{L-2} n_0 + \ldots + h_0 n_{L-2} = r_{2L-2}/a$$

A set of equations as given above is found for each PN sequence grouping. Thus, for each PN sequence grouping there is the matrix equation:

$$nh = r/a$$

Where the matrix n consists of rows being the cycles of the deployed PN sequence within a specific grouping. This matrix is:

$$n = \begin{bmatrix} n_0 & n_1 & n_2 & \ldots & n_{L-1} \\ n_1 & n_2 & n_3 & \ldots & n_0 \\ & & \ldots & & \\ n_{L-1} & n_0 & n_1 & \ldots & n_{L-2} \end{bmatrix}$$

The PN entries within the matrix are +/−1, and the matrix is symmetric. Modulation methodology as applied to the PN sequences distinguishes the first and second training sequences under discussion. Both use violated OQPSK modulation, however, the first such training sequence involves a 180 degree phase shift in the modulation protocol and so does not follow strict OQPSK protocol, while the same does not apply to the second training sequence.

More particularly considering the first training sequence, it employs the PN sequences as described above as well as the matrix equation:

$$nh = r/a$$

For this case, the entries within the n matrix are encoded using QPSK such that: Encode +1 as 1I+i, and −1 as −1−i. With this encoding this equation becomes:

$$nh=r/(1+i)$$

Known correlation properties of the PN sequence matrix provides:

$$Ch=n'nh=n'r/(1+i)$$

C is the correlation matrix consisting of value L on the main diagonal and −1 elsewhere, and it could be written as:

$$C=(L+1)I-A$$

where I is the L×L identity matrix and A is a matrix of all ones. The inverse of C is:

$$C^{-1}=(I+A)/(L+1)$$

Which is confirmed by multiplying the two matrices together. As a result it follows that:

$$h=(I+A)/(L+1)n'r/(1+i)$$

Thus, independent of which PN sequence grouping is being used, a channel impulse response h can be obtained. This results in a shifting window type algorithm. A distinct channel impulse response observation is obtained for each grouping by shifting a window from grouping to grouping.

All PN sequences have the same matrix I+A which consists of values 2 on the main diagonal and values 1 elsewhere. L is a fixed number equaling the PN sequence length, L+1 is an integral power of 2, r is the observed received values. However, n'=n is an L by L matrix consisting of entries +/−1 which does depend upon which PN sequence grouping is employed.

Now, considering the second exemplary training sequence, it also employs the PN sequence groupings as described above, however different modulation is used. Now: Encode +1 as 1+i, and −1 as 1−i. This encoding when applied to entries within matrix n results in the new matrix P. Thus, P is the n matrix with entries encoded as just described.

With this encoding the L×L matrix P is such that:

$$P=A+in$$

Here, as before, A is the L×L matrix of all ones, and it is true that for any PN sequence grouping:

$$Ph=r$$

Multiply both sides of this equation by:

$$A-in'$$

where n' is the transpose of n, this yields:

$$(A^2+C)h=(A-in')r$$

This follows because the matrices n and A have special forms. Specifically A has a value of one for all entries, and the row and column sum of entries within n are always one. As a result:

$$n'A=An$$

The matrix C is the correlation matrix mentioned earlier. Since $$C=(L+1)I-A \text{ and } A^2=LA$$

It follows that:

$$((L+1)I+(L-1)A)h=(A-in')r$$

By letting $\alpha=(L-1)/(L+1)$

Inversion gives: $h=((I-\alpha A)/(1+\alpha L))(A-in')r/(L+1)$

The value α is a dyadic fraction, i.e., it is an integer divided by a power of two. I is the L×L identity matrix and A is the all ones matrix. The whole quantity within the first set of parenthesis does not depend on which PN sequence grouping is transmitted. Only the matrix n'=n depends on the specific PN sequence which is chosen under control of a cryptographic unit in this example. Hardware implications and approximations will be discussed.

In view of the preceding description, it will be understood that different possible violations in the OQPSK modulation syntax add further to the overwhelming large number of distinct possible training sequence transmissions of the type illustrated in FIG. 1 which can be employed in training sequences pursuant to the invention.

As mentioned earlier, every PN sequence grouping has a primitive polynomial determined by databits from a cryptographic unit. Additionally, the PN sequence starting points are also determined by such bits. With an understanding of the invention, skilled persons will be enabled to employ known techniques to use cryptographic data bits to accomplish selection of PN sequences, intermediate integers, etc., in a manner consistent with security or other objectives consistent with particular implementations. Thus, PN sequences may be stored using shift register, phase shift network, code book, or other techniques and then selected for specific training sequence inclusion by application of cryptographic data bits or other approaches.

Considerations regarding approximations for the following equation which was presented above will now be addressed:

$$h=((I-\alpha A)/(1+\alpha L))(A-in')r/(L+1)$$

By letting:

$$\beta=\alpha/(1+\alpha L)$$

it follows that:

$$h=((I-\beta A)(A-in')r/(L+1)$$

Using the fact that:

$$A^2=LA$$

it also follows that:

$$h=[((1-\beta L)/(L+1))A-i((I-\beta A)/(L+1))n]r$$

which equals:

$$h=[((1-\beta L)/(L+1))A-i((n-\beta A/(L+1))]r$$

because:

$$n'A=An=A$$

Possible implementation of the equation for h within hardware requiring extremely few multiplications is provided next. It is described in 5 steps, and entails no approximations. The first three steps can be performed without knowledge of the actual PN sequence deployed in the training process.

1) Pre multiply and scale forming the constant real values:

$$\delta=(1-\beta L)/(L+1)=(1-\beta L)2^{-m}$$

$$\gamma=\beta/(L+1)=\beta 2^{-m}$$

2) Form the L×1 complex valued vector s, which has all tuples identical and equal to the sum of values within the received vector r:

$$s=Ar$$

3) Calculate the L×1 complex values vectors x, and y which entail only a single multiplication because all entries of s are the same:

$$x=\delta s, \text{ and } y=\gamma s$$

4) By adding and subtracting entries within r as prescribed by the PN sequence rows within matrix n, form the L×1 complex valued vector z which is scaled by $2^{-m}$:

$$z=nr/(L+1)=nr2^{-m}$$

5) Add to form h:

$$h=x-i(z-y)$$

Finally, an algorithm with no multiplies at all can be obtained for L large. Indeed, in this case let:

$$\alpha\cong 1, \beta\cong 1/(1+L)$$

and so these approximations give:

$$h=[(1/(L+1)^2)A-i((n-\beta A)/(L+1))]r$$

which is:

$$h=[(1/(L+1)^2)A-i((n-A/(L+1))/(L+1))]r$$

or:

$$h=[2^{-2m}A-i2^{-m}(n-2^{-m}A)]r$$

Use of this equation instead of the exact one above results in a difference beginning only at five decimal places.

Figure 5:
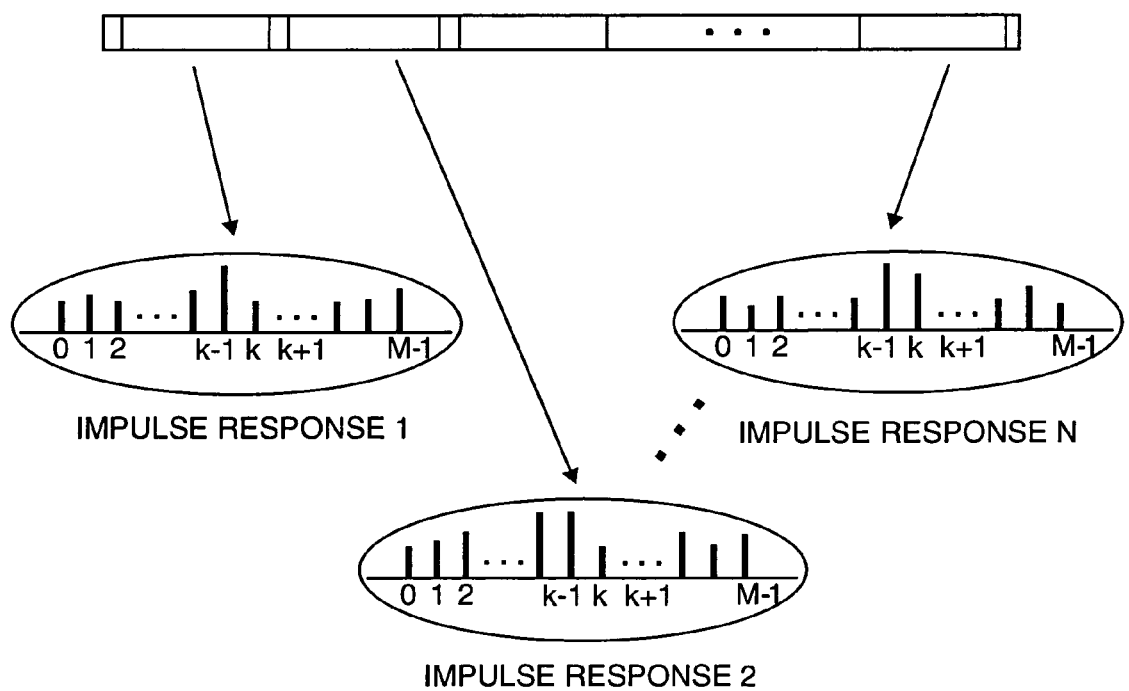
FIG. 5 illustrates the deriving of several CIR observations via processing of a single training sequence.
Figure 6:
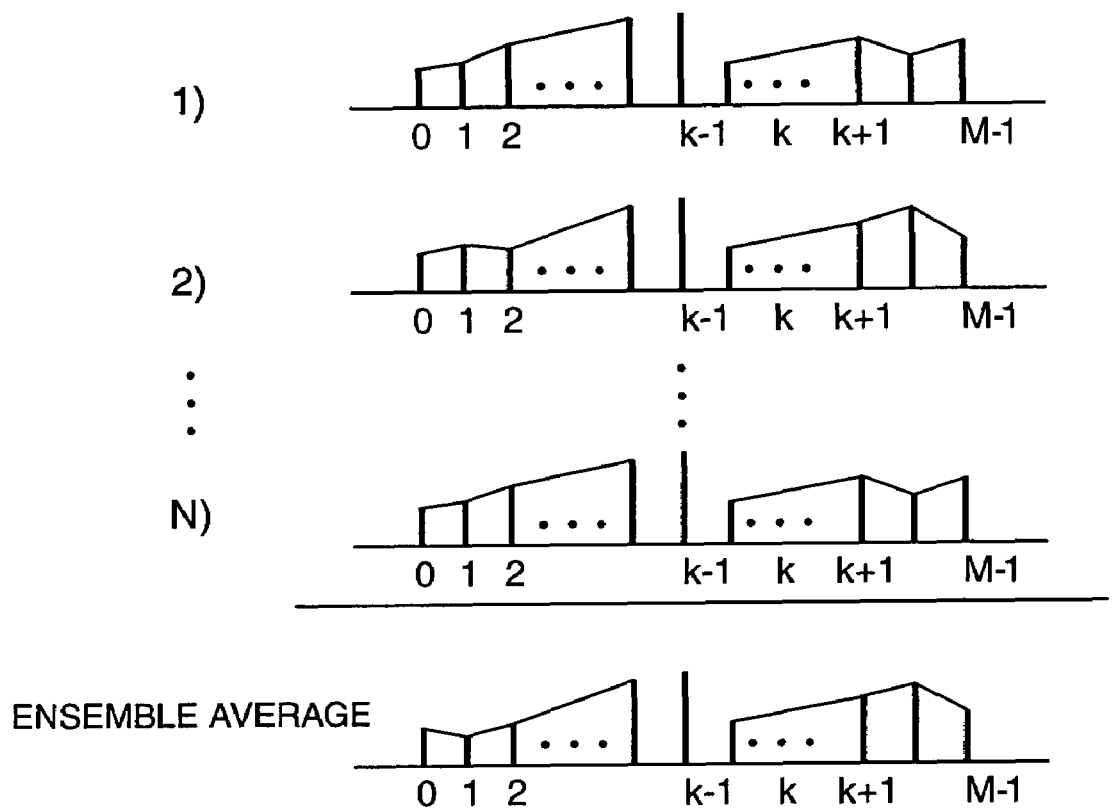
FIG. 6 illustrates the averaging of several CIR observations to derive a CIR estimation.

The use of a training sequence of the type shown in FIG. 1 to provide several distinct observations of the channel impulse response has been described. This is illustrated in FIG. 5, wherein for each PN sequence grouping a CIR is provided. In this diagram, corresponding to each of the assumed N PN groupings there is a channel impulse response. An ensemble average is then taken. The diagram of FIG. 6 shows that each of the M complex valued tuples within a CIR undergo the same treatment. Values for all N observations corresponding to a fixed tuple location are added together, and the sum is divided by N. This is the ensemble average of all the N observations.

By performing the ensemble average a more accurate representation of the CIR is obtained. The resulting averaged CIR estimation has a reduction in variance by a factor 1/N. Thus the larger the N the less variance.

The resulting CIR estimation, as determined on an averaged basis as described, provides increased accuracy of CIR determination, while also providing a high level of signal security and permitting processing without requirements for multiplication or division of complex functions. As noted above, the first and second training sequences addressed may each have the form illustrated in FIG. 1, while the first employs QPSK modulation of the PN sequences and the second employs a form of OQPSK modulation protocol. With an understanding of the invention skilled persons will be enabled to employ a variety of specific signal and modulation techniques as suitable to particular implementations. The second training sequence as described is the presently preferred embodiment, partially in view of the presence of a 180 degree phase shift implemented in the modulation of the first training sequence as described. In each such case the multiple PN sequence groupings enable the benefits of multiple CIR observations, with specifics such as form of modulation, etc., selected in accordance with particular objectives in different applications.

While there have been described the currently preferred embodiments of the invention, those skilled in the art will recognize that other and further modifications may be made without departing from the invention and it is intended to claim all modifications and variations as fall within the scope of the invention.

What is claimed is:

1. A communication system, usable with a wireless communication channel, comprising:
 a transmitting configuration arranged to transmit via said channel a training sequence usable for channel impulse response (CIR) estimation, said training sequence comprising
 a first pseudonoise (PN) sequence grouping including a selected PN sequence followed by a repeated portion of said selected PN sequence,
 a series of additional PN sequence groupings following said first PN sequence grouping, said series comprising at least one additional PN sequence grouping including a distinct PN sequence followed by a repeated portion of said distinct PN sequence, said distinct PN sequence differing from said selected PN sequence, and
 intermediate integers positioned between said PN sequence groupings, said intermediate integers comprising a selected number of integers of at least one selected value; and
 a receiving configuration arranged to process said training sequence as received via said channel (i) to provide a first CIR observation by use of said first PN sequence grouping as received and at least one additional CIR observation by use of said series of additional PN sequence groupings and (ii) to provide a CIR estimation via an averaging of values of said first and additional CIR observations.

2. A communication system as in claim 1, wherein in the training sequence said series of additional PN sequence groupings comprises at least three additional PN sequence groupings.

3. A communication system as in claim 1, wherein in the training sequence the series of additional PN sequence groupings comprises a plurality of additional PN sequence groupings each utilizing a randomly selected PN sequence followed by a repeated portion of that randomly selected PN sequence, with each PN sequence grouping of the training sequence utilizing a PN sequence different than the PN sequence utilized in every other PN sequence grouping.

4. A communication system as in claim 1, wherein in each said PN sequence, the repeated portion of the PN sequence omits the last bit of the PN sequence which the repeated portion of the PN sequence follows.

5. A communication system as in claim 1, wherein said intermediate integers comprise a random selection of from one to three integers of randomly selected polarity positioned between each pair of successive PN sequence groupings.

6. A communication system as in claim 1, wherein said training sequence additionally comprises:
 at least one leading integer preceding said first PN sequence grouping and at least one trailing integer following the last PN sequence grouping, said at least one leading and trailing integers each comprising a selected number of integers of at least one selected polarity.

7. A communication system as in claim 1, wherein the receiving configuration is arranged to provide a CIR observation based upon a PN sequence grouping without employing multiplication or division functions for that purpose.

8. A communication system as in claim 1, wherein said receiving configuration is additionally arranged to utilize said CIR estimation for determination of coefficients to be applied to taps of an adaptive equalizer unit.

9. A communication system, usable with a wireless communication channel, comprising:
 a receiving configuration arranged to process a training sequence as received via said channel to provide channel impulse response (CIR) observation and including an adaptive equalizer unit with a predetermined number of inputs;
 a transmitting configuration arranged to transmit via said channel a training sequence usable for said CIR observation, said training sequence comprising
 a first pseudonoise (PN) sequence grouping including a selected PN sequence followed by a repeated portion of said selected PN sequence,
 a series of additional PN sequence groupings following said first PN sequence grouping, said series comprising at least one additional PN sequence grouping including a distinct PN sequence followed by a repeated portion of said distinct PN sequence, said distinct PN sequence differing from said selected PN sequence, and
 intermediate integers positioned between said PN sequence groupings, said intermediate integers comprising a selected number of integers of at least one selected value.

10. A communication system as in claim 9, wherein each PN sequence is nominally of maximal length, including a number of integers nominally equal to the number of inputs to said adaptive equalizer unit.

11. A communication system as in claim 9, wherein in the training sequence said series of additional PN sequence groupings comprises at least three additional PN sequence groupings.

12. A communication system as in claim 9, wherein in the training sequence the series of additional PN sequence groupings comprises a plurality of additional PN sequence groupings each utilizing a randomly selected PN sequence followed by a repeated portion of that randomly selected sequence, with each PN sequence grouping of the training sequence utilizing a PN sequence different than the PN sequence utilized in every other PN sequence grouping.

13. A communication system as in claim 9, wherein in each said PN sequence, the repeated portion of the PN sequence omits the last bit of the PN sequence which the repeated portion of the PN sequence follows.

14. A communication system as in claim 9, wherein said intermediate integers comprise a random selection of from one to three integers of randomly selected polarity positioned between each pair of successive PN sequence groupings.

15. A communication system as in claim 9, wherein said training sequence additionally comprises:
 at least one leading integer preceding said first PN sequence grouping and at least one trailing integer following the last PN sequence grouping, said at least one leading and trailing integers each comprising a selected number of integers of at least one selected polarity.

16. A communication system as in claim 9, wherein the transmitting configuration is arranged to transmit said training sequence including a plurality of PN sequence groupings and the receiving configuration is arranged to provide a plurality of CIR observations, each based upon one PN sequence grouping of said plurality thereof.

17. A communication system as in claim 16, wherein the receiving configuration is arranged to provide a CIR estimation by an averaging of values of said plurality of CIR observations.

18. A communication system, usable with a wireless communication channel, comprising:
 a transmitting configuration arranged to transmit via said channel a training sequence usable for channel impulse response (CIR) estimation, said training sequence comprising
 a first pseudonoise (PN) sequence grouping including a selected PN sequence followed by a repeated portion of said selected PN sequence;
 a series of additional PN sequence groupings following said first PN sequence grouping, said series comprising at least one additional PN sequence grouping, including a distinct PN sequence followed by a repeated portion of said distinct PN sequence, said distinct PN sequence differing from said selected PN sequence; and
 intermediate integers positioned between said PN sequence groupings, said intermediate integers comprising a selected number of integers of at least one selected value.

19. A communication system as in claim 18, wherein in the training sequence said series of additional PN sequence groupings comprises at least three additional PN sequence groupings.

20. A communication system as in claim 18, wherein in the training sequence said series of additional PN sequence groupings comprises a plurality of additional PN sequence groupings each utilizing a randomly selected PN sequence followed by a repeated portion of that randomly selected PN sequence, with each PN sequence grouping of the training sequence utilizing a PN sequence different than the PN sequence utilized in every other PN sequence grouping.

21. A communication system as in claim 18, wherein in each said PN sequence, the repeated portion of the PN sequence omits the last bit of the PN sequence which it follows.

22. A communication system as in claim 18, wherein said intermediate integers comprise a random selection of from one to three integers of randomly selected polarity positioned between each pair of successive PN sequence groupings.

23. A communication system as in claim 18, wherein said training sequence additionally comprises:
 at least one leading integer preceding said first PN sequence grouping and at least one trailing integer following the last PN sequence grouping, said at least one leading and trailing integers each comprising a selected number of integers of at least one selected polarity.

24. A communication system as in claim 18, comprising:
 a receiving configuration including an adaptive equalizer unit having a predetermined number of inputs and arranged to use the training sequence of claim 18 to derive estimations of CIR; and
 said transmitting configuration arranged to transmit the training sequence to said receiving configuration.

25. A method, of providing a training sequence for estimation of channel impulse response of a wireless communication channel, comprising the steps of:
 (a) assembling a first pseudonoise (PN) sequence grouping including a selected PN sequence followed by a repeated portion of said selected PN sequence;

(b) assembling a series of additional PN sequence groupings comprising at least one additional PN sequence grouping including a distinct PN sequence followed by a repeated portion of said distinct PN sequence, said distinct PN sequence differing from said selected PN sequence;

(c) assembling a training sequence including said first and additional PN sequence groupings and intermediate integers positioned between said PN sequence groupings, said intermediate integers comprising a selected number of integers of at least one selected value:

(d) transmitting said training sequence;

(e) receiving said training sequence;

(f) deriving a plurality of CIR observations, one based on each of said first and additional PN sequence groupings, and (g) deriving a CIR estimation based on an averaging of values of said plurality of CIR observations.

26. A method as in claim 25, wherein step (b) comprises assembling a series of additional PN sequence groupings including at least three additional PN sequence groupings.

27. A method as in claim 25, wherein step (b) comprises assembling a series of additional PN sequence groupings including a plurality of additional PN sequence groupings each utilizing a randomly selected PN sequence followed by a repeated portion of that randomly selected PN sequence, with each PN sequence grouping utilizing a different PN sequence.

28. A method as in claim 25, wherein in each said PN sequence, the repeated portion of the PN sequence omits the last bit of the PN sequence which the repeated portion of the PN sequence follows.

29. A method as in claim 25, wherein step (c) comprises assembling a training sequence including intermediate integers comprising a random selection of from one to three integers of randomly selected polarity.

30. A method as in claim 25, wherein step (c) comprises assembling a training sequence additionally including:

at least one leading integer preceding said first PN sequence grouping and at least one trailing integer following the last PN sequence grouping, said at least one leading and trailing integers each comprising a selected number of integers of at least one selected polarity.

* * * * *